: US009542911B2

(12) United States Patent
Tsukagoshi

(10) Patent No.: US 9,542,911 B2
(45) Date of Patent: Jan. 10, 2017

(54) DISPLAY APPARATUS AND METHOD FOR CONTROLLING DISPLAY APPARATUS

(71) Applicant: Seiko Epson Corporation, Tokyo (JP)

(72) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 416 days.

(21) Appl. No.: 13/969,646

(22) Filed: Aug. 19, 2013

(65) Prior Publication Data
US 2014/0085346 A1 Mar. 27, 2014

(30) Foreign Application Priority Data

Sep. 24, 2012 (JP) ................. 2012-209255

(51) Int. Cl.
G09G 5/10 (2006.01)
G09G 3/20 (2006.01)
G09G 3/34 (2006.01)
H04N 9/31 (2006.01)
G09G 3/36 (2006.01)

(52) U.S. Cl.
CPC ............. *G09G 5/10* (2013.01); *G09G 3/2037* (2013.01); *G09G 3/3406* (2013.01); *H04N 9/3105* (2013.01); *H04N 9/3155* (2013.01); *H04N 9/3158* (2013.01); *H04N 9/3161* (2013.01); *G09G 3/2077* (2013.01); *G09G 3/3413* (2013.01); *G09G 3/3611* (2013.01); *G09G 2320/0633* (2013.01)

(58) Field of Classification Search
CPC .. G09G 3/2037; G09G 3/3406; G09G 3/2077; G09G 3/3413; G09G 3/3611; G09G 5/10; G09G 2320/0633; H04N 9/3105; H04N 9/3155; H04N 9/3158; H04N 9/3161
USPC .......................................................... 345/102
See application file for complete search history.

(56) References Cited

U.S. PATENT DOCUMENTS

| 8,730,148 B2 * | 5/2014 | Park ..................... G09G 3/3426 345/102 |
| 2008/0165810 A1 * | 7/2008 | Takeda .................... H01S 5/042 372/21 |

(Continued)

FOREIGN PATENT DOCUMENTS

| CN | 1842923 A | 10/2006 |
| CN | 102402953 A | 4/2012 |

(Continued)

*Primary Examiner* — Michael Pervan
*Assistant Examiner* — Andrew Lee
(74) *Attorney, Agent, or Firm* — ALG Intellectual Property, LLC

(57) ABSTRACT

A display apparatus includes: a display unit including a modulator that modulates a plurality of color light fluxes and a light source section that includes a plurality of light sources corresponding to at least any of the color light fluxes; a light source driver that supplies the light sources with pulse currents; and a controller that sets the cycle of each of the pulse currents and an ON-period of the pulses in the pulse current in accordance with the luminance of the light source, wherein when the luminance of any of the light sources is so set that the ON-period of the pulse current is shorter than a preset lower limit, the controller sets the length of the ON period of the pulse current to be equal to the lower limit or at a value longer than the lower limit and reduces the current value of the pulse current.

8 Claims, 7 Drawing Sheets

(56) References Cited

U.S. PATENT DOCUMENTS

| | | | |
|---|---|---|---|
| 2008/0238341 A1* | 10/2008 | Korcharz | G09G 3/3413 315/297 |
| 2009/0021178 A1 | 1/2009 | Furukawa et al. | |
| 2009/0179848 A1 | 7/2009 | Schmidt et al. | |
| 2009/0256973 A1* | 10/2009 | Bazzani | G09G 3/3426 348/744 |
| 2010/0020008 A1* | 1/2010 | Kobayashi | G09G 3/3413 345/102 |
| 2010/0045895 A1 | 2/2010 | Komiya | |
| 2010/0181921 A1 | 7/2010 | Furukawa et al. | |
| 2010/0231864 A1* | 9/2010 | Shibasaki | G03B 21/14 353/31 |
| 2012/0068978 A1* | 3/2012 | Aitken | G09G 3/3406 345/207 |
| 2012/0299979 A1 | 11/2012 | Murai et al. | |
| 2013/0147381 A1 | 6/2013 | Yang | |

FOREIGN PATENT DOCUMENTS

| | | |
|---|---|---|
| JP | 2003-348877 A | 12/2003 |
| JP | 2009-175695 A | 8/2009 |
| JP | 2010-51068 A | 3/2010 |
| WO | WO-2011-104952 A | 9/2011 |

* cited by examiner

DISPLAY APPARATUS AND METHOD FOR CONTROLLING DISPLAY APPARATUS

CROSS-REFERENCE

The entire disclosure of Japanese Patent Application No. 2012-209255 filed on Sep. 24, 2012, which is hereby incorporated by reference in its entirety.

BACKGROUND

1. Technical Field

The present invention relates to a display apparatus that displays an image by using a light source and a method for controlling the display apparatus.

2. Related Art

To adjust the luminance of a light source of a display apparatus, there has been a known apparatus that controls a light source based on PWM (pulse width modulation) (see JP-A-2010-051068, for example). In a control process of this type, the luminance of a light source is adjusted by causing the light source to periodically start and stop emitting light and changing the ratio between the light-on period and the light-off period.

A light source, such as an LED used in the configuration described in JP-A-2010-051068 and a laser, has a lower limit specified in the specifications of the light source, and the light source cannot follow input pulses shorter than the lower limit, which is a problem because the adjustable range of the luminance of the light source is limited on the low luminance side.

SUMMARY

An advantage of some aspects of the invention is to adjust the luminance of a light source over a wider range by driving the light source to periodically start and stop emitting light and changing the ratio between the light-on period and the light-off period.

An aspect of the invention is directed to a display apparatus including a display unit including a modulator that modulates a plurality of color light fluxes and a light source section that includes a plurality of light sources corresponding to at least any of the color light fluxes, a light source driver that supplies the light sources with pulse currents to cause the light sources to emit light fluxes, and a controller that sets the cycle of the pulse current supplied to each of the light sources by the light source driver and an ON-period of the pulses in the pulse current in accordance with the luminance of the light source, and when the luminance of any of the light sources is so set that the ON-period of the pulse current flowing through the light source is shorter than a preset lower limit, the controller sets the length of the ON period of the pulse current flowing through the light source to be equal to the lower limit or at a value longer than the lower limit and reduces the current value of the pulse current flowing through the light source.

According to the aspect of the invention, the luminance of any of the light sources can be adjusted to a lower value by reducing the value of the current supplied to the light source without the period over which the light source emits light being shorter than the lower limit, whereby the light source is allowed to emit light in a stable manner and the adjustable range of the luminance of the light source can be widened.

Another aspect of the invention is directed to the display apparatus according to the aspect described above, wherein an ON period ratio among the pulse currents flowing through the light sources or a luminance ratio among the light sources is set to achieve a preset ratio among the amounts of the plurality of color light fluxes.

According to the aspect of the invention, the luminance adjustment range is not restricted in a configuration in which the luminance values of the laser light sources are not equal to each other and the luminance adjustment range of one of the laser light sources limits the luminance adjustment ranges of the other laser light sources, whereby an image can be expressed over a wide grayscale range and hence the quality of the displayed image can be enhanced.

Still another aspect of the invention is directed to the display apparatus according to the aspect described above, wherein, when the current value of the pulse current flowing through one of the light sources is to be reduced, the controller sets a longer ON period of the pulse current flowing through the light source than the ON period in a case where the current value is not reduced.

According to the aspect of the invention, the luminance of the light source can be minutely adjusted because the luminance of the light source is lowered by reducing the current value of the pulse current whereas the luminance is increased by setting a longer ON period of the pulse current.

Yet another aspect of the invention is directed to the display apparatus according to the aspect of the invention described above, which further includes a current setting unit that sets a current value common to the plurality of light sources, and when the current setting unit changes the current value of the currents supplied to the light sources to a lower value, the controller changes the ON period of the pulse current flowing through any of the light sources in such a way that a decrease in the luminance thereof due to the decrease in the current value is compensated.

According to the aspect of the invention, setting current values by using a unit common to the plurality of light sources allows simplification of the circuit configuration and hence achieves cost reduction and efficient control. In the configuration described above, in which the current values of the pulse currents that allow the plurality of light sources to emit light are reduced by the same amount, the luminance values of all the light sources can be adjusted to necessary luminance values by changing the ON periods of the pulse currents.

Still yet another aspect of the invention is directed to the display apparatus according to the aspect of the invention described above, wherein the controller switches a current value of the pulse current flowing through each of the light sources to another in a stepwise manner.

According to the aspect of the invention, a simple configuration that switches a current value to another in a stepwise manner can widen the adjustable range of the luminance of the laser light sources.

Further another aspect of the invention is directed to a method for controlling a display apparatus that modulates a plurality of color light fluxes to display an image, the method including supplying light sources with pulse currents to cause the light sources to emit light fluxes, setting a cycle of the pulse current supplied to each of the light sources and an ON-period of the pulses in the pulse current in accordance with the luminance of the light source, and when the luminance of any of the light sources is so set that the ON-period of the pulse current flowing through the light source is shorter than a preset lower limit, setting the length of the ON period of the pulse current flowing through the light source to be equal to the lower limit or at a value longer than the lower limit and reducing the current value of the pulse current flowing through the light source.

According to the aspect of the invention, the luminance of any of the light sources can be adjusted to a lower value by reducing the value of the current supplied to the light source without the period over which the light source emits light being shorter than the lower limit, whereby the light source is allowed to emit light in a stable manner and the adjustable range of the luminance of the light source can be widened.

According to the aspects of the invention, the light sources are allowed to emit light in a stable manner, and the adjustable range of the luminance values of the light sources can be widened for high-quality image display.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An embodiment to which the invention is applied will be described below with reference to the drawings.

Figure 1:
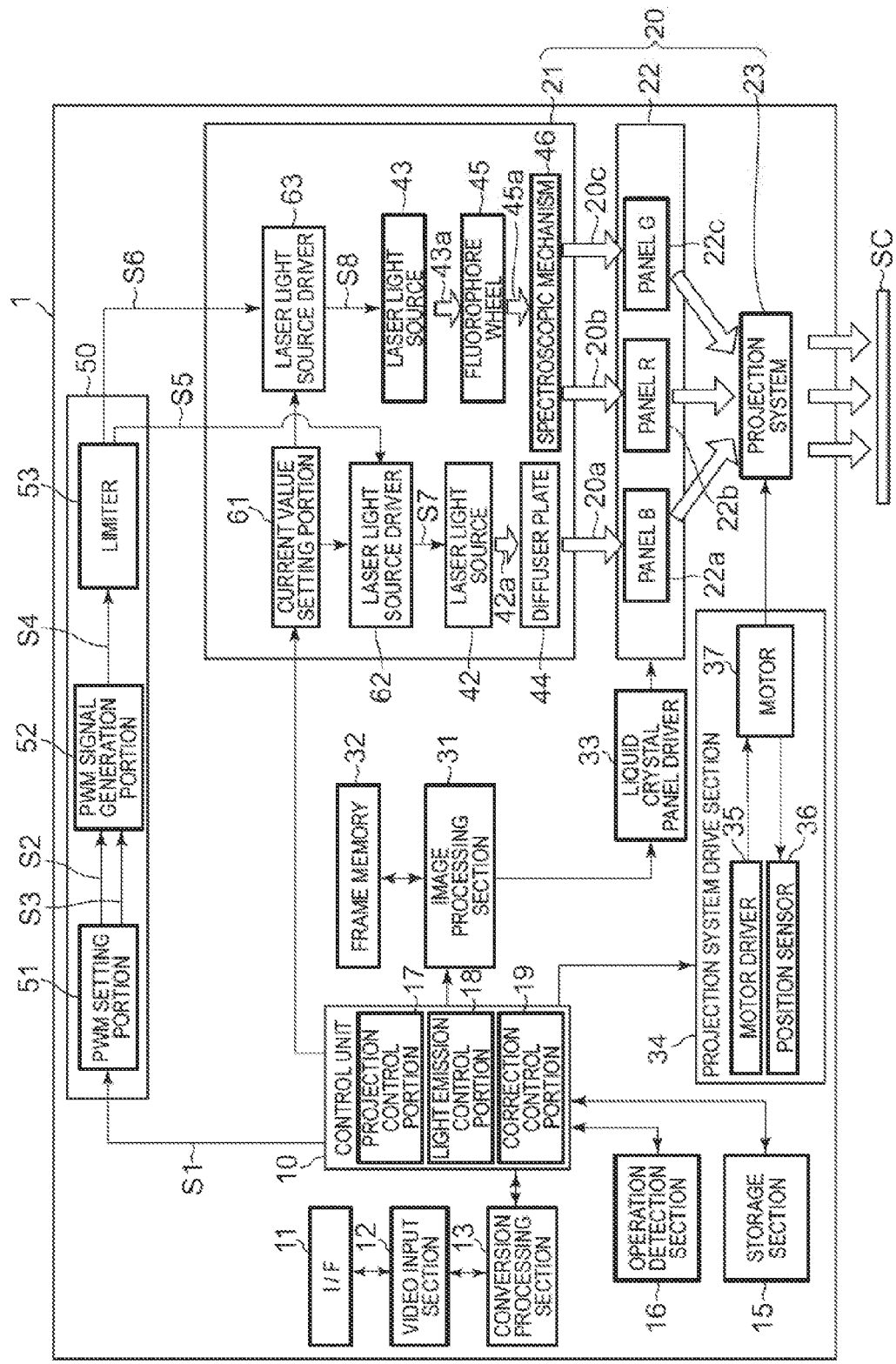
FIG. 1 is a functional block diagram of a projector.

FIG. 1 is a block diagram showing a functional configuration of a projector 1 according to the embodiment. The projector 1, which works as a display apparatus that projects an image on a screen SC (projection surface), is connected to an external image supply apparatus (not shown), such as a PC or any other computer and a variety of image players, any of which is not shown, via an I/F (interface) 11 and projects an image based on digital image data inputted through the interface 11 on the screen SC.

The projector 1 includes a projection unit 20 (display unit), which forms an optical image, and an image processing system that electrically processes an image signal to be inputted to the projection unit 20, and the projection unit 20 and the image processing system operate under the control of a control unit 10.

The projection unit 20 includes a light source section 21, a light modulation device (modulator) 22, and a projection system 23 (projection section). The light source section 21 includes a light source the luminance of which can be controlled by using a pulse signal based on PWM control, such as an LED (light emitting diode) and a laser light source. In the present embodiment, the light source section 21 has, by way of example, a configuration including laser light sources 42 and 43 formed of two blue semiconductor laser devices that emit blue laser light beams. The laser light sources 42 and 43 may alternatively be formed of a plurality of semiconductor devices that emit a plurality of laser light beams. Still alternatively, the light source section 21 may further include an optical scanner that scans an object with the light beams emitted from the laser light sources 42 and 43, a lens group (not shown) that enhances optical characteristics of the emitted light beams, and a light controller that reduces the amount of light beams.

The light modulation device 22 receives a signal from the image processing system, which will be described later, and modulates the light beams outputted from the light source section 21 based on the signal to form image light fluxes. The light modulation device 22 is specifically configured based, for example, on a method using three transmissive or reflective liquid crystal light valves corresponding to RGB colors. It is assumed in the present embodiment that the light modulation device 22 has a configuration including three transmissive liquid crystal panels corresponding to RGB three color light beams, that is, a liquid crystal panel 22a, which modulates blue light (B), a liquid crystal panel 22b, which modulates red light (R), and a liquid crystal panel 22c, which modulates green light (G). The liquid crystal panels 22a, 22b, and 22c provided in the light modulation device 22 are driven by a liquid crystal panel driver 33, which will be described later, and an image is formed by changing light transmittance in pixels arranged in a matrix in each of the liquid crystal panels.

The RGB color light fluxes having undergone the modulation in the light modulation device 22 are combined with each other in a cross dichroic prism (not shown), and the combined light is guided to the projection system 23.

The projection system 23 includes a lens group and other components for projecting the modulated light fluxes from the light modulation device 22 on the screen SC to form an image. The projection system 23 further performs zoom adjustment, focus adjustment, and diaphragm adjustment when the lens group (not shown) is driven by a motor 37 provided in a projection system drive section 34. The projection system drive section 34 drives the projection system 23 under the control of the control unit 10.

The light source section 21, which includes the laser light sources 42 and 43, each of which is formed of a blue semiconductor laser device that emits blue laser light, further includes laser light source drivers 62 and 63 (light source drivers), which control the laser light sources 42 and 43 under the control of the control unit 10, a current control portion 61, which sets a current value used by the laser light source drivers 62 and 63 under the control of the control unit 10, a diffuser plate 44, which diffuses a color light beam, a fluorophore wheel 45, which converts a color light beam incident thereon into a color light flux having a predetermined color, and a spectroscopic mechanism 46, which separates a color light flux incident thereon into color light fluxes having predetermined colors. The light source section 21 is connected to a light source drive section 50, which outputs pulse signals S5 and S6 for controlling the light emission of the laser light sources 42 and 43.

The current control portion 61 sets a current value commonly used by the laser light source drivers 62 and 63 in accordance with control information inputted from the control unit 10. It is noted that the current control portion 61 does not set separate current values used by the laser light source drivers 62 and 63.

The laser light source driver 62 produces, based on electric power supplied from a power source circuit (not shown) in the projector 1, a pulse current S7 synchronized with the pulse signal S5 inputted from the light source drive section 50 and having the current value set by the current control portion 61 and supplies the laser light source 42 with the pulse current S7.

The laser light source driver 63 produces, based on the electric power supplied from the power source circuit (not shown) in the projector 1, a pulse current S8 synchronized with the pulse signal S6 inputted from the light source drive section 50 and having the current value set by the current control portion 61 and supplies the laser light source 43 with the pulse current S8.

The length of an ON period of each of the pulse currents S7 and S8 (pulse width), the length of an OFF period thereof, and the cycle thereof are therefore determined by the corresponding one of the pulse signals S5 and S6 inputted from the light source drive section 50. On the other hand, the current values of the pulse currents S7 and S8 are determined by the control unit 10, and the thus determined current values are set by the current control portion 61.

The pulse currents S7 and S8 control the start and stop of light emission of the laser light sources 42 and 43. The laser light sources 42 and 43 emit light during the period over which the pulses of the pulse currents S7 and S8 are ON, whereas they do not emit light during the period over which the pulses of the pulse currents S7 and S8 are OFF. Since each of the pulse currents S7 and S8 is a signal formed of pulses that are switched from ON or OFF to the other at high speed, the laser light sources 42 and 43 repeatedly start and stop emitting light at high speed, and the luminance of each of the laser light sources 42 and 43 is determined by the ratio between the light-on period and the light-off period. The luminance of each of the laser light sources 42 and 43 can therefore be adjusted based on the ratio between the period over which the pulses of the corresponding one of the pulse currents S7 and S8 are ON and the period over which the pulses of the pulse current are OFF.

The laser light source 42 emits blue laser light 42a when driven by the pulse current S7 outputted from the laser light source driver 62, and the blue laser light 42a is incident on the diffuser plate 44 and diffused therein. The laser light diffused by the diffuser plate 44 is incident as blue light 20a on the liquid crystal panel 22a and modulated thereby. On the other hand, the laser light source 43 emits blue laser light 43a, as the laser light source 42 does, when driven by the pulse current S8 outputted from the laser light source driver 63. The blue laser light 43a is incident on a fluorophore on the fluorophore wheel 45 and converted into yellow light 45a, and the converted yellow light 45a is incident on the spectroscopic mechanism 46. The spectroscopic mechanism 46 separates the yellow light 45a incident thereon in terms of wavelength component into red light 20b and green light 20c. The separated red light 20b and green light 20c are incident on the liquid crystal panel 22b and the liquid crystal panel 22c, respectively. Modulated image light fluxes from the liquid crystal panels 22a, 22b, and 22c are combined with each other in the projection system 23 as described above and projected on the screen SC.

The light source drive section 50 (light source drive unit), which includes a PWM setting portion 51, a PWM signal generating portion 52, and a limiter 53, controls the start and stop of light emission of the laser light sources 42 and 43 and adjusts the luminance thereof by controlling the laser light source drivers 62 and 63 in accordance with a control signal 51 inputted from the control unit 10 to control the laser light sources 42 and 43 based on PWM control. The PWM setting portion 51 produces a PWM frequency signal S2, which specifies the pulse frequency, and an ON-period specifying signal S3, which specifies the pulse width, in accordance with the control signal 51 inputted from the control unit 10 and outputs the signals S2 and S3. The PWM signal generating portion 52 produces a PWM signal S4, which has pulses that cause the laser light sources 42 and 43 to emit light, in accordance with the PWM frequency signal S2 and the ON-period specifying signal S3 inputted from the PWM setting portion 51 and outputs the signal S4. The PWM signal generating portion 52 can alternatively produce and output a PWM signal S4a for controlling the laser light source 42 and a PWM signal S4b for controlling the laser light source 43 separately. The PWM signal S4 outputted from the PWM signal generating portion 52 is inputted to the limiter 53. The limiter 53 (limiter) is a filter that removes part of the pulses contained in the PWM signal S4, that is, pulses having a pulse width narrower than a preset value. The limiter 53 outputs pulse signals S5 and S6 to the laser light source drivers 62 and 63 respectively in the light source unit 21.

As described above, the laser light source drivers 62 and 63 cause the laser light sources 42 and 43 to start emitting light when the pulses in the pulse signals S5 and S6 rise to an ON level, whereas causing the laser light sources 42 and 43 to stop emitting light when the pulses fall to an OFF level. When the pulse width of each of the pulse signals S5 and S6 is too small for the laser light sources 42 and 43 to follow or start and stop emitting light, the light emission of the laser light sources 42 and 43 is not stable, which possibly causes the luminance of each of the laser light sources 42 and 43 not to reach a specified value and other problems. To avoid the problems, the limiter 53 removes pulses having a pulse width smaller than a preset value to stabilize the action of the laser light sources 42 and 43.

The projector 1 includes the interface 11, a video input section 12, and a conversion processing section 13. Image data inputted to the video input section 12 via the interface 11 undergo resolution conversion and other scaling processes in the conversion processing section 13, and the processed image data are outputted to the control unit 10. A conceivable example of the image data inputted to the projector 1 is motion image (video image) data but may alternatively be still image data.

For example, the interface 11 is a DVI (Digital Visual Interface) interface, to which a digital video signal is inputted, a USB interface, and a LAN interface and has a terminal compliant with the DisplayPort (trademark) standard established by VESA (Video Electronics Standards Association), an S video terminal, to which a composite video signal based on NTSC, PAL, SECAM, or any other standard is inputted, an RCA terminal, to which a composite video signal is inputted, a D terminal, to which a component video signal is inputted, and an HDMI (registered trademark) terminal compliant with the HDMI standard. In preparation for an input of an analog video signal via the interface 11, the video input section 12 may be configured to have an A/D conversion circuit that converts the analog video signal into digital image data. Further, the interface 11 may be provided with a wireless communication interface.

The projector 1 includes the following components as the image processing system; the control unit 10, which oversees and controls the entire projector 1, a storage section 15, which stores data processed by the control unit 10 and a control program executed by the control unit 10, an operation detection section 16, which detects operation performed via a remote control or an operation panel (not shown), an image processing section 31, which processes image data, and the liquid crystal panel driver 33, which drives the liquid crystal panels 22a, 22b, and 22c in the light modulation device 22 based on an image signal outputted from the image processing section 31 to draw images.

The control unit 10 reads and executes the control program stored in the storage section 15 to control the components in the projector 1. The control unit 10 controls the image processing section 31, the liquid crystal panel driver 33, the projection system drive section 34, and the light source drive section 50 based on operation information detected by the operation detection section 16 and representing operation performed by a user, and an image is thus projected on the screen SC.

The operation detection section 16 has not only a function of receiving a wireless signal transmitted from the remote control (not shown) with which the user operates the projector 1, decoding the received signal, and detecting operation performed via the remote control but also a function of detecting operation performed on a button on the operation panel (not shown) of the projector 1. The operation detection section 16 generates an operation signal representing the operation performed via the remote control or the operation panel and outputs the operation signal to the control unit 10. Further, the operation detection section 16 controls a light-on state of an indicator lamp (not shown) provided on the projector 1 in accordance with the action state and settings of the projector 1 under the control of the control unit 10.

The image processing section 31 acquires the image data outputted from the conversion processing section 13 under the control of the control unit 10 and identifies the image size, the resolution, whether the image data is formed of still images or motion images, and attributes of the image data, such as the frame rate in the case of motion images. The image processing section 31 then loads the acquired images into the frame memory 32 on a frame basis. The image processing section 31 further performs resolution conversion when the resolution of the acquired image data differs from the display resolution of the liquid crystal panels 22a, 22b, and 22c in the light modulation device 22, performs enlargement/reduction when the operation detection section 16 detects operation information representing a zooming instruction issued by the user who operates the remote control or the operation panel, and loads the processed images into the frame memory 32. The image processing section 31 then outputs a display signal carrying the images loaded into the frame memory 32 on a frame basis to the liquid crystal panel driver 33.

The control unit 10 (controller) provides functions of a projection control portion 17, a light emission control portion 18, and a correction control portion 19 by executing the control program stored in the storage section 15.

The projection control portion 17 initializes the components in the projector 1, controls the light source drive section 50 to cause the laser light sources 42 and 43 to start emitting light, controls the image processing section 31 and the liquid crystal panel driver 33 to cause the liquid crystal panels 22a, 22b, and 22c to draw images for image projection in accordance with operation detected by the operation detection section 16. The projection control portion 17 further controls the projection system drive section 34 to drive the motor 37 for focus adjustment, zoom adjustment, diaphragm adjustment, and other adjustment operation.

The light emission control portion 18 generates the control signal S1 and outputs the control signals to the light source drive section 50. The control signal S1 contains information that specifies at least two of the pulse width, the pulse cycle, and the pulse-off period of each of the pulse signals S5 and S6. The light emission control portion 18 adjusts the luminance of each of the laser light sources 42 and 43 by using the control signal S1 to adjust the ratio between the light-on period and the light-off period of the corresponding one of the laser light sources 42 and 43.

The correction control portion 19 calculates the inclination of the screen SC with respect to the projector 1 (projection angle) and the projection distance from the projector 1 to the screen SC and performs trapezoidal distortion correction and other correction. The correction control portion 19 corrects the distortion of a projected image on the screen SC by controlling the image processing section 31 based on the calculated projection angle and projection distance to deform images loaded into the frame memory 32. A satisfactory rectangular image is thus displayed. For example, when a sensor or any other component (not shown) detects any disorder of a projected image on the screen SC or when operation performed via the operation panel (not shown) instructs to perform the correction, the correction control portion 19 calculates the projection angle and the projection distance to calculate the correction parameters and corrects the projected image in accordance with the calculated parameters.

The projector 1 is so configured that a cross dichroic prism (not shown) combines the three color light fluxes, blue (B), red (R), and green (G) light fluxes, for image projection. Further, in the projector 1, the blue laser light 43a emitted from the laser light source 43 is incident on the fluorophore wheel 45, where the blue laser light 43a is converted into the yellow light 45a, and the converted yellow light 45a is incident on the spectroscopic mechanism 46, which separates the yellow light 45a into the red light 20b and the green light 20c. When the red light 20b and the green light 20c have the same amount of light and the laser light sources 42 and 43 are driven to emit light beams of the same luminance, each of the amount of red light 20b and the amount of green light 20c is one-half the amount of blue light 20a. In other words, to allow the color light fluxes, the blue light 20a, the red light 20b, and the green light 20c, to have the same amount of light, the luminance of the laser light source 42 needs to be one-half the luminance of the laser light source 43. Further, for example, the projector 1 is in some cases capable of setting what is called a color mode that allows the user to set a mode in which a reddish image is displayed or a mode in which a bluish image is displayed by adjusting the color tone of an image projected on the screen SC. In this case, the amounts of color light fluxes are not the same but different from each other in accordance with a selected mode. In this case, it is also necessary to adjust the luminance of each of the laser light sources 42 and 43 also in consideration of the fact that the number of laser light sources 42 and 43 differs from the number of color light fluxes.

In practice, the ratio among the amounts of blue light 20a, red light 20b, and green light 20c may be affected by a conversion efficiency at which the fluorophore wheel 45 converts the blue laser light 43a into the yellow light 45a, the diffusion state in the diffuser plate 44, and other factors. In such a case, the ratio among the amounts of color light fluxes may be determined in advance in consideration of the factors described above. Further, for example, when the blue light 20a, the red light 20b, and the green light 20c are emitted from respective different laser light sources, the ratio among the amounts of color light fluxes, which is also affected by the fluorophore, the diffuser plate, and other factors, may similarly be determined in advance in consideration of the factors described above. Since the degree of influence of each of the factors described above varies quite a lot due to individual product differences, an optimum ratio can be set for each product of the projector 1.

In view of the fact described above, in the projector 1, to allow the amounts of color light fluxes, the blue light 20a, the red light 20b, and the green light 20c, to be suitably balanced, the laser light sources 42 and 43 are driven to emit light fluxes at different luminance values. It is assumed in the present embodiment that the ratio (proportion) of the luminance of the laser light source 42 to the luminance of the laser light source 43 is so set that the amount of blue light 20a is smaller than those of red light 20b and green light 20c. The settings on the luminance values of the laser light sources 42 and 43 and the amounts of color light fluxes are stored in the storage section 15. For example, when the projector 1 projects a white image, the amount of blue laser light 42a emitted from the laser light source 42 is set at a proportion of 80% and the amount of yellow light 45a produced by the fluorophore wheel 45, which converts the light emitted from the laser light source 43, is set at a proportion of 100%.

As described above, the pulse width over which the laser light sources 42 and 43 emit light has a lower limit, and pulses shorter than the lower limit are removed by the limiter 53. The lower limit of the pulse width determines the lower limit of the luminance of each of the laser light sources 42 and 43.

When the brightness of an image projected by the projector 1 is adjusted, the lower limit of the brightness of the projected image is determined by the lower limit of the luminance of the laser light source 42, that is, the lower limit of the pulse width of the PWM signal that causes the laser light source 42 to emit light, because the luminance of the laser light source 42 is set to be lower than the luminance of the laser light source 43 as described above.

For example, when the lower limit of the pulse width is 20 µs (microseconds) and the PWM frequency is 960 Hz, one cycle of the pulse signal is 1.04 ms (milliseconds) and the pulse width of 20 µs corresponds to 1.92% of one cycle. Now, let a luminance of 100% be maximum luminance of the light emitted from the laser light sources 42 and 43. The minimum luminance of the laser light sources 42 and 43 is therefore a luminance of 1.92%, which means that when the laser light sources are set to emit light having luminance lower than the luminance of 1.92%, the laser light sources 42 and 43 do not emit light because the limiter 53 removes the pulses in the thus set pulse signal.

In the configuration in which the projector 1 projects a white image by setting the amounts of light beams from the light sources in such a way that the amount of blue laser light 42a is 80% and the amount of yellow light 45a is 100%, for example, reducing the brightness of the white image to 50% the maximum brightness requires setting the amount of blue laser light 42a at 40% and the amount of yellow light 45a at 50%. Further, to reduce the brightness of the white image to 2% the maximum brightness, the amount of blue laser light 42a is set at 1.6% and the amount of yellow light 45a is set at 2%. In this case, the luminance of the laser light source 42 needs to be set at a luminance of 1.6% against the minimum luminance of 1.92%, and the pulse width for achieving the luminance of 1.6% is 16.7 µs, which is shorter than the pulse width lower limit of 20 µs, and the limiter 53 removes the thus set pulses.

As described above, in the projector 1, which includes the plurality of laser light sources 42 and 43 and projects an image based on the plurality of color light fluxes, the luminance values of the light sources are adjusted at different values in accordance with the color balance of a projected image. An adjustment limit of the luminance of one of the light sources therefore determines an adjustment limit of the brightness of a projected image.

In view of the fact described above, the projector according to the present embodiment is so configured that the pulse width is always set at a value that is not lower than the lower limit and that the luminance of each of the laser light sources 42 and 43 is adjustable to a value lower than the luminance corresponding to the lower limit of the pulse width.

The light emission control portion 18 can adjust not only the cycle, pulse width, and the length of the pulse-off period of each of the pulse currents S7 and S8 supplied to the laser light sources 42 and 43 but also the current value of each of the pulse currents S7 and S8. Specifically, the light emission control portion 18 outputs current value specifying control information to the current control portion 61 to change current values set by the current control section 61 and used by the laser light source drivers 62 and 63. Since the current values of the currents flowing through the laser light sources 42 and 43 during the pulse-on period of the pulse currents S7 and S8 are thus changed, the luminance of each of the laser light sources 42 and 43 can be lowered without any decrease in the pulse width.

Figure 2:
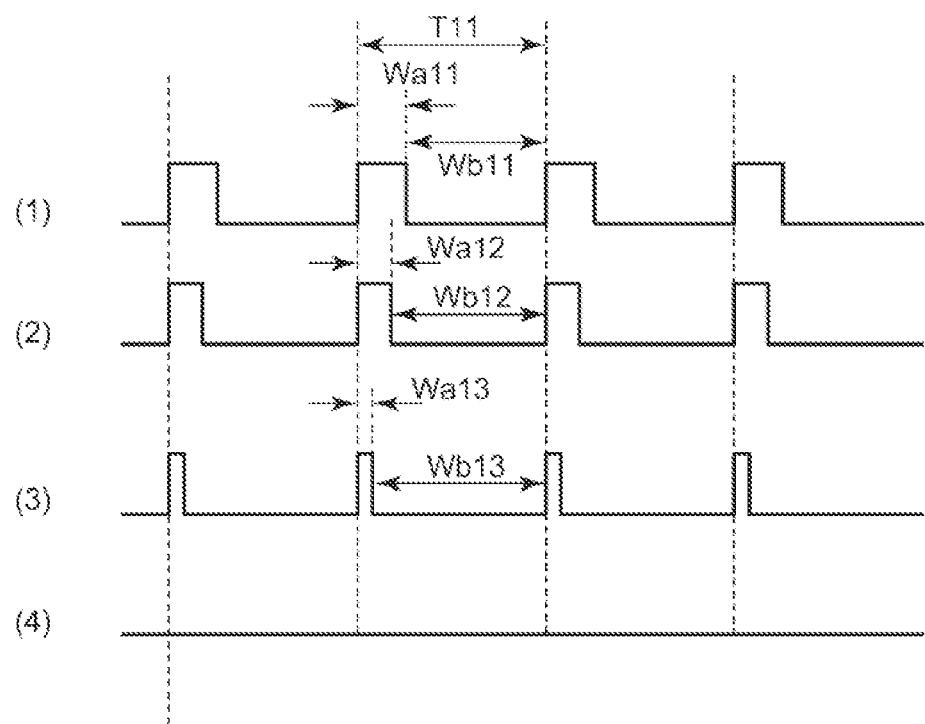
FIG. 2 is a timing chart of a pulse current that causes a laser light source to emit light.
Figure 3A:
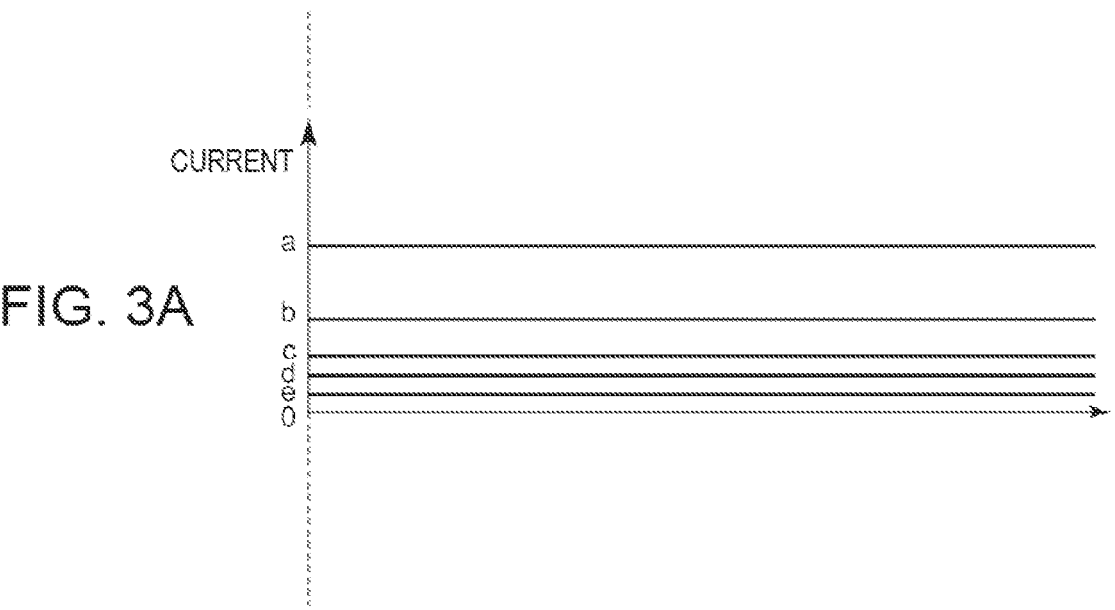
FIG. 3A shows current values.
Figure 3B:
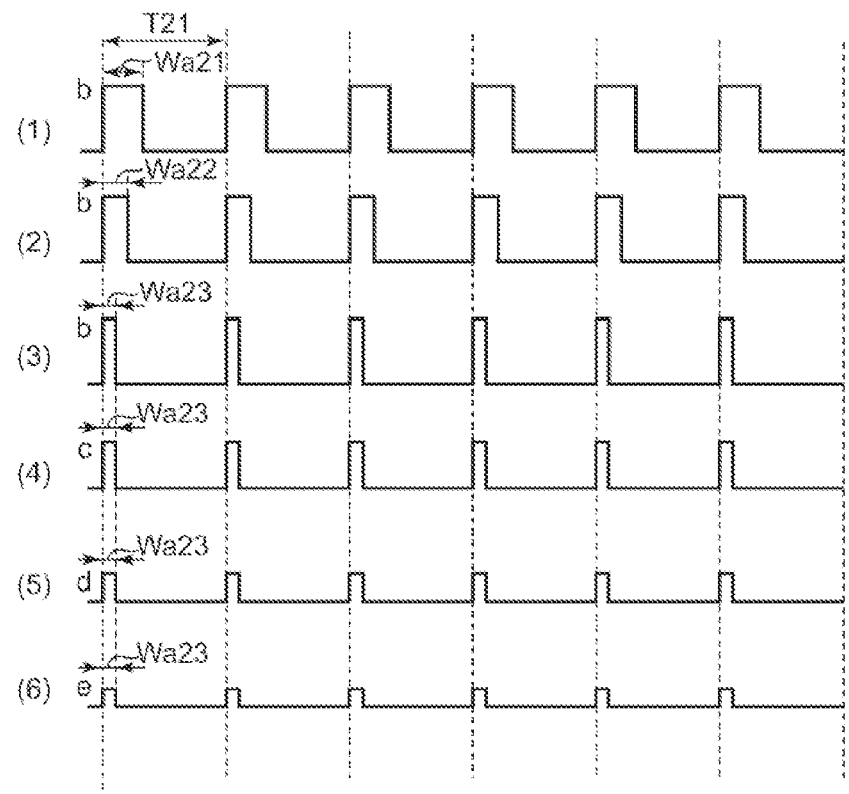
FIG. 3B is another timing chart of a pulse current that causes a laser light source to emit light.

FIG. 2 is a timing chart of the pulse signals S5 and S6 for controlling the light emission of the laser light sources 42 and 43. FIGS. 3A and 3B show the pulse currents S7 and S8. FIG. 3A shows the current values of the pulse currents S7 and S8, and FIG. 3B is a timing chart of the pulse currents S7 and S8.

FIG. 2 shows a case where the pulse cycle of each of the pulse signals is fixed and the pulse width of the pulse signal is successively narrowed. The pulse width Wa13 of the pulse signal shown in (3) in FIG. 2 is set at a value smaller than the lower limit of 20 µs.

The laser light sources 42 and 43, which are driven by the laser light source drivers 62 and 63 in accordance with the pulse currents S7 and S8, emit light during the pulse-on periods of the pulse currents S7 and S8 but do not emit light during the pulse-off periods of the pulse currents S7 and S8. The pulse currents S7 and S8 supplied to the laser light sources 42 and 43 are synchronized with the pulse signals S5 and S6, respectively. The pulse-on periods and the pulse-off periods of the pulse signals S5 and S6 can therefore be taken as the light-on periods and the light-off periods of the laser light sources 42 and 43.

In FIG. 2, (1) shows a pulse signal having a cycle T11, a pulse width Wa11, which represents the ON period, and an OFF period Wb11. Since the laser light source drivers 62 and 63 cause the laser light sources 42 and 43 to emit light during the ON periods of the pulses of the pulse signals, the luminance of each of the laser light sources 42 and 43 increases as the proportion of the ON period of the pulses of the corresponding pulse signal to the cycle thereof increases.

When the pulse cycle is fixed at T11, and the pulse width is successively narrowed from Wa11 through Wa12 to Wa13 as shown in (1) to (3) in FIG. 2, the luminance of each of the laser light sources 42 and 43 is lowered in this order. The light emission control portion 18 calculates the proportion of the pulse width to the pulse cycle in accordance with specified luminance at which each of the laser light sources 42 and 43 emits light or target luminance of each of the laser light sources 42 and 43 calculated by the light emission control portion 18. The light emission control portion 18 then determines the pulse width (length of ON period), the pulse cycle, and the pulse-off period based on the calculated proportion for both the laser light sources 42 and 43. The light emission control portion 18 then outputs the control signal S1, which causes the light source drive section 50 to output the pulse signals S5 and S6 each having the determined cycle, pulse width, and OFF period.

The limiter 53, however, removes pulses having a pulse width narrower than a preset lower limit, as described above. For example, when the limiter 53 is configured to remove pulses shorter than 20 µs, the pulse signal shown in (3) in FIG. 2, in which the pulse width is shorter than 20 µs, are not outputted to the light source section 21 because the limiter 53 removes the pulses of the pulse signal, as shown in (4) in FIG. 2. When the cycle is fixed as described above, the luminance cannot be adjusted to a value lower than the luminance corresponding to the lower limit of the pulse width.

The luminance can, however, be adjusted to a value lower than the luminance corresponding to the lower limit of the pulse width by adjusting the current value of the pulse signal. FIG. 3A shows that the light emission control portion 18 can control the current control portion 61 to set the current value at any of five values "a" to "e". In a normal projection state, the current value is set at the second largest current value "b". The current value "b" is, for example, a rated current value of each of the laser light sources 42 and 43.

Further, to adjust the luminance of each of the laser light sources 42 and 43 to a lower luminance value, the current control portion 61 sets the current value at any of the current values "c", "d", and "e". The current control portion 61 and the laser light source drivers 62 and 63, which change the current value in a stepwise manner, are readily achieved based on a simple circuit configuration. The current value "a" will be described later.

FIG. 3B shows pulse currents having a fixed pulse cycle with at least one of the pulse width and the current value changed to adjust the luminance of each of the laser light sources 42 and 43, and the height of the waveform of each pulse current represents the magnitude of the current value. Further, the pulse width Wa23 of the pulse current shown in (3) in FIG. 3B is set to be equal to the lower limit. In practice, each current waveform is not a rectangular wave, such as the one shown in FIG. 3B, due to the characteristics of the laser light source drivers 62 and 63 but may be a curved line. In the description, however, each waveform is drawn in the form of a rectangular wave for ease of understanding.

In FIG. 3B, (1) shows a pulse current having a cycle T21, a pulse width Wa21, and an OFF period Wb21. The current value of the pulse current is set at the current value "b" of the rated current. To reduce the luminance of the laser light source to which the pulse current shown in (1) in FIG. 3B is inputted, the light emission control portion 18 performs control in which the pulse width of the pulse current is narrowed to Wa22 and then Wa23, as shown in (2) and (3) in FIG. 3B. It is noted that the control can be performed by changing the information carried by the control signal S1 described above.

When the pulse width Wa23 of the pulse current reaches a preset lower limit as shown in (3) in FIG. 3B, the pulse width W cannot be narrowed any more.

In this case, the light emission control portion 18 controls the current control portion 61 to reduce the current value of the pulse current. The current value of the pule current can be reduced in a stepwise manner to the current values "c", "d", and "e" as shown in (4) to (6) in FIG. 3B, and the luminance of the laser light source 42 decreases in a stepwise manner accordingly.

The luminance values of the laser light sources 42 and 43 to which the thus changed current values of the pulse currents S7 and S8 are supplied do not always change in exact proportion to the current values because the luminance values are affected by the specifications and characteristics of the laser light sources 42 and 43. Nevertheless, the light emission control portion 18 adjusts the luminance values of the laser light sources 42 and 43 by changing the pulse widths of the pulse currents S7 and S8 when the pulse widths are wider than or equal to the lower limit set by the limiter 53, whereas adjusting the luminance values by reducing the current values when the pulse widths are narrower than the lower limit. The approach described above achieves image quality that does not cause a person who views an image projected on the screen SC to feel something wrong with the image even when the luminance of each of the laser light sources 42 and 43 does not change in exact proportion to a decrease in the current values.

Further, since the light emission control portion 18 can reduce the current values of the pulse currents S7 and S8 in a stepwise manner, changes in the luminance of each of the laser light sources 42 and 43 caused by a change in the current value can be calculated in advance in the form of a luminance change coefficient for each current value, and the calculated luminance change coefficient can be stored in the storage section 15. In this case, the light emission control portion 18 can predict, based on the coefficients stored in the storage section 15, a luminance change caused by a change in the current value, whereby the luminance of each of the laser light sources 42 and 43 can be more precisely adjusted.

Since the current control portion 61 sets a common current value in the laser light source drivers 62 and 63, changing the current value of the pulse current as described above in order to adjust the luminance of one of the laser light sources 42 and 43 changes the current value of the pulse current supplied to the other light source and hence changes the luminance of the other light source.

In view of the situation described above, when the current value of the pulse current is changed to adjust the luminance of part of the plurality of laser light sources 42 and 43, the light emission control portion 18 in the present embodiment carries out a process of widening the pulse width of the pulse current supplied to the light source that is not under the adjustment so that the amount of decrease in the luminance due to the decrease in the current value is compensated. Since carrying out the process changes the luminance of only part of the plurality of laser light sources 42 and 43 whereas maintaining the luminance of the other light source, the luminance of each of the light sources can be arbitrarily adjusted even in the configuration in which pulse currents having a common current value are supplied to the light sources.

Figure 4:
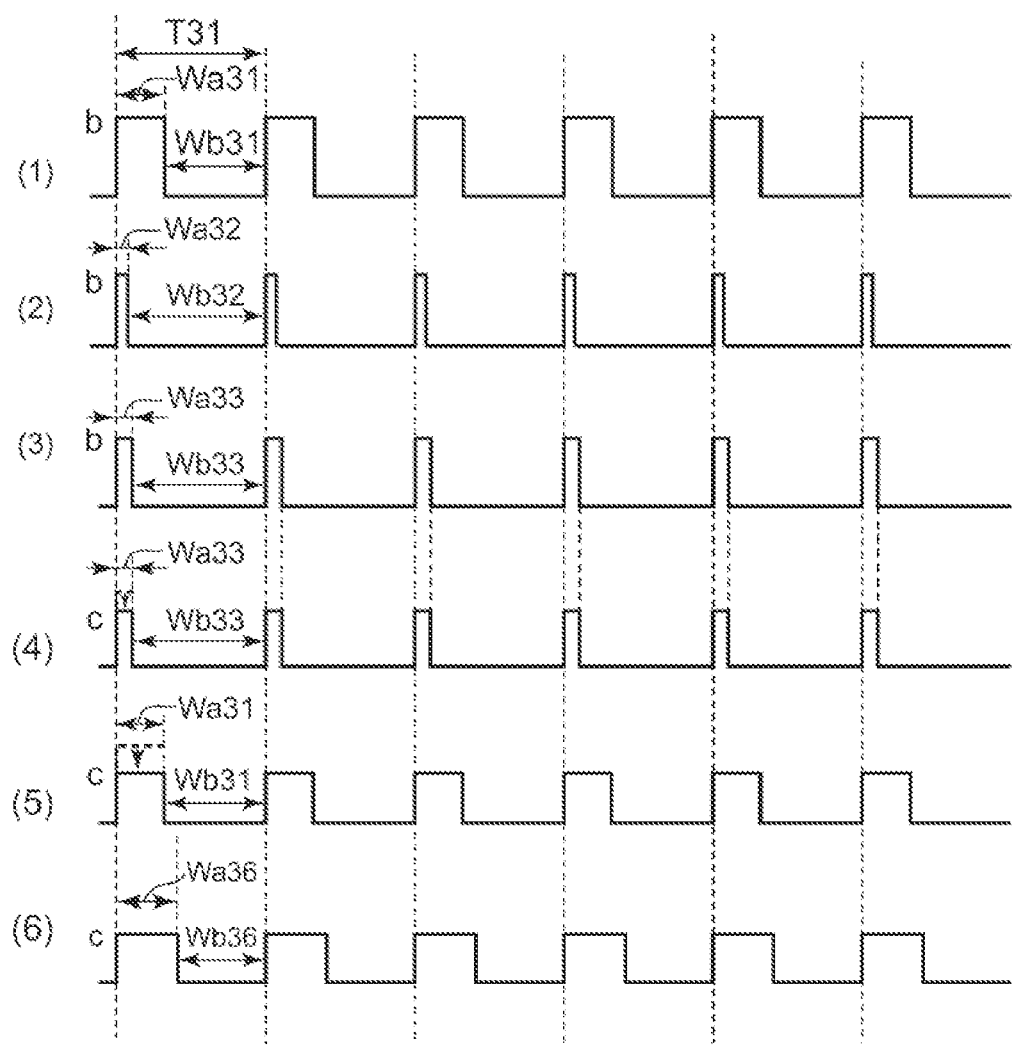
FIG. 4 is another timing chart of a pulse current that causes a laser light source to emit light.

FIG. 4 is a timing chart of the pulse currents S7 and S8 for controlling the light emission of the laser light sources 42 and 43. In FIG. 4, (1) shows a pulse current supplied to the laser light sources 42 and 43 in an initial state before luminance adjustment. It is assumed in the example shown in FIG. 4 that in the initial state, a pulse current having a common cycle, pulse width, and OFF period is supplied to each of the light sources. Further, (2) to (4) in FIG. 4 show pulse currents supplied to one of the laser light sources 42 and 43, and (5) and (6) in FIG. 4 show pulse currents supplied to the other laser light source.

In FIG. 4, (1) shows a pulse current having a cycle T31, a pulse width Wa31, and an OFF period Wb31. The current value of the pulse current shown in (1) is set at the current value "b" of the rated current. To reduce the luminance of the laser light source to which the pulse current shown in (1) in FIG. 4 is inputted, the light emission control portion 18 performs control in which the pulse width of the pulse current is narrowed, as described above. That is, the control is so performed that the pulse width is set at Wa32, as shown in (2) in FIG. 4. When the pulse width Wa32 is narrower than the lower limit, the light emission control portion 18 changes the pulse width to Wa33, which is wider than or equal to the lower limit. The light emission control portion 18 then reduces the current value of the pulse current to the current value "c" from the rated current value "b" in order to lower the luminance of the laser light source with the pulse width being a value greater than or equal to the lower limit, as shown in (4) in FIG. 4. The light emission control portion 18 thus adjusts the luminance of one of the laser light sources 42 and 43 to a target value.

When the light emission control portion 18 adjusts the luminance of the laser light source under the luminance adjustment as shown in (2) to (4) in FIG. 4, the current value of the pulse current supplied to the other laser light source is also set at the current value "c", which is lower than the rated current value "b", as shown in (5) in FIG. 4. To adjust the luminance of the other laser light source to a value similar to the value in the state in which the pulse current shown in (1) in FIG. 4 is supplied, the light emission control portion 18 widens the pulse width (ON period) of the pulse current supplied to the other laser light source. The pulse current thus has an widened pulse width Wa36 as shown in (6) in FIG. 4, and the laser light source to which the pulse current is supplied emits light having the luminance before the adjustment because the ON period is so increased that the amount of decrease in the current value of the pulse current is substantially compensated.

Further, since the pulse current shown in (6) in FIG. 4 is the current value "c", which is lower than the rated value, the pulse width Wa36 can be changed to a value greater than a rated pulse width. In this case, the degree of freedom in adjusting the pulse width increases when the current value of the pulse current is adjusted to a low value, whereby the luminance of the laser light source can be adjusted to an appropriate value in a more reliable manner.

Figure 5:
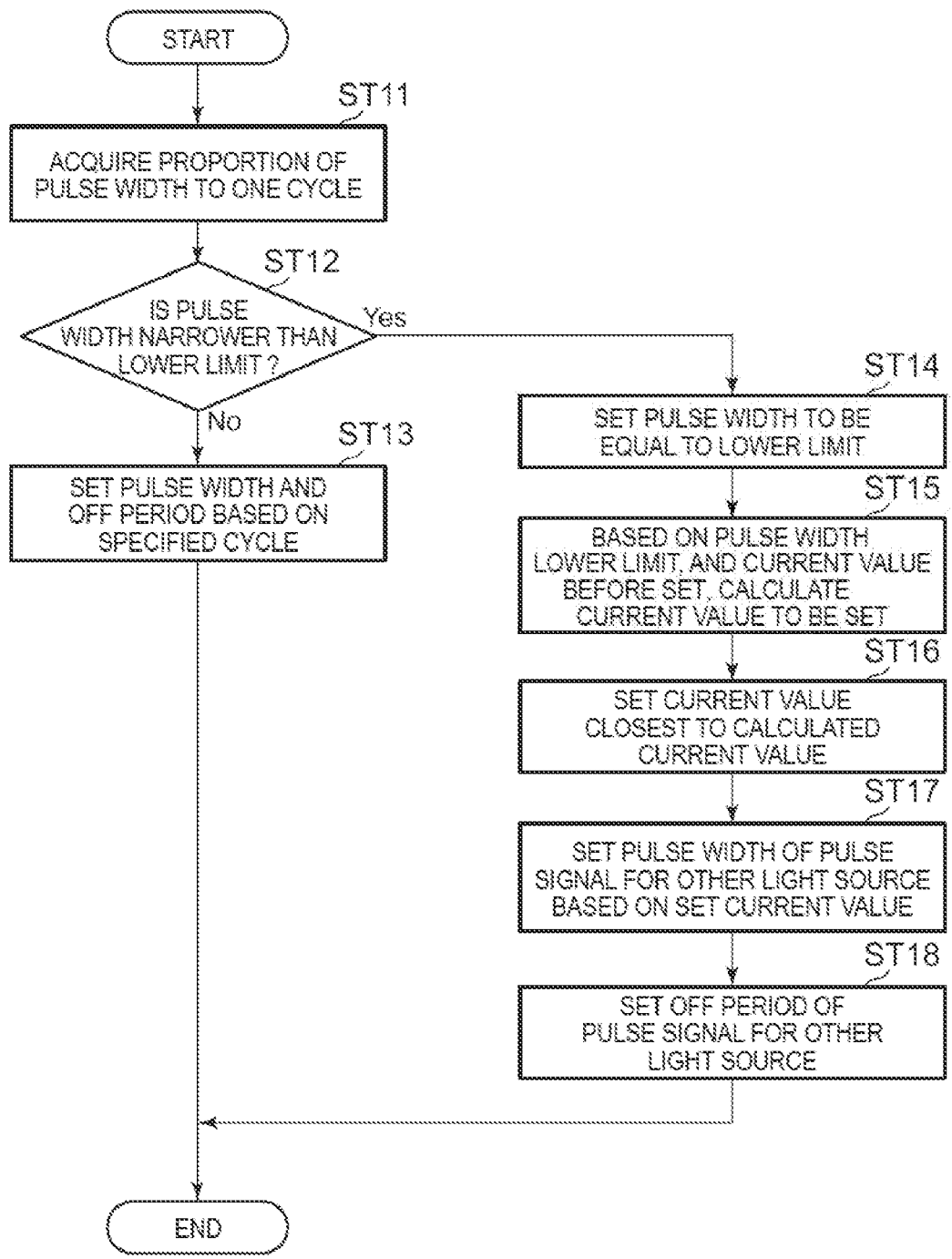
FIG. 5 is a flowchart showing the action of the projector.

FIG. 5 is a flowchart showing the action of the projector 1 according to the present embodiment. FIG. 5 particularly shows the action of the projector 1 performed when the light emission control portion 18 controls the pulse width and the current value of each of the pulse currents S7 and S8.

The action shown in FIG. 5 is performed not only when the projection is initiated but also at predetermined intervals during a period over which the light emission control portion 18 controls the light source drive section 50 and the laser light source drivers 62 and 63.

The light emission control portion 18 chooses one of the laser light sources 42 and 43 as a target to be controlled and acquires the proportion of the pulse width (length of ON period) of the pulse signal corresponding to the laser light source under the control to one cycle of the pulse signal (step ST11). More specifically, the light emission control portion 18 acquires the luminance of the laser light source under the control and calculates the proportion of the length of the period over which the laser light source emits light to the length of the period over which the laser light source does not emit light. Since the proportion of the light-on period to the light-off period of each of the laser light sources 42 and 43 is equal to the proportion of the pulse width to the OFF period of the corresponding one of the pulse currents S7 and S8 (and pulse signals S5 and S6), the light emission control portion 18 determines the pulse width of the pulse signal with respect to one cycle thereof based on the proportion of the light-on period to the light-off period. One cycle of the pulse signal may be set in advance as an initial value or may be set when the procedure shown in FIG. 5 is performed. The thus set cycle is used as a specified value.

The light emission control portion 18 judges whether or not the pulse width determined based on the proportion acquired in step ST11 is narrower than a preset lower limit (step ST12). The lower limit is a value set in advance, for example, in accordance with a restriction in the specification of each of the laser light sources 42 and 43 and stored, for example, in the storage section 15. The lower limit may be equal to a threshold based on which the limiter 53 removes pulses.

When the pulse width is wider than or equal to the lower limit (step ST12: No), the light emission control portion 18 sets the cycle of the pulse signal at the specified value, sets the pulse width Wa and the length of the OFF period Wb based on the specified value and the proportion acquired in step ST11 (step ST13), and terminates the procedure. The light emission control portion 18 then carries out the processes in step ST11 and the following steps on the pulse signal for controlling the other laser light source that has not been under control. The light emission control portion 18 then outputs the control signal S1, which causes the pulse signals S5 and S6 containing the thus set cycles, pulse widths, OFF periods, to be outputted to the light source drive section 50.

On the other hand, in step ST12, when the pulse signal for controlling the one laser light source under the control is set to emit light having a small amount of light, for example, for adjustment of balance between the amounts of light, and hence the pulse width is narrower than the lower limit as in the case of the pulse current shown in (3) in FIG. 2 (step ST12: Yes), the light emission control portion 18 changes the pulse width Wa to Wa33, which is equal to the lower limit, (step ST14) and further calculates the current value in such a way that luminance similar to the target low value is achieved based on the proportion of the pulse width Wa, calculated in step ST11, to the specified cycle of the pulse signal shown in (3) in FIG. 4 (step ST15). The light emission control portion 18 selects a current value closest to the calculated current value from the current values settable by the current control portion 61 and uses the current control portion 61 to set the selected current value in the laser light source drivers 62 and 63 (step ST16). The current control portion 61 sets the current value at any of the values "b", "c", "d", and "e" including the rated current value "b" in a stepwise manner as shown, for example, in (3) to (6) in FIG. 3B. Therefore, when the light emission control portion 18 cannot set the exact current value calculated in step ST15, the light emission control portion 18 uses the current control portion 61 to set a current value closest to the calculated current value.

The light emission control portion 18 then sets, in correspondence with the operation of changing and setting the current value in step ST16, the pulse width of the pulse signal for controlling the other laser light source that has not been under the control based on the proportion of the pulse width to the specified cycle (step ST17). In this process, the light emission control portion 18 sets the pulse width in such a way that the luminance of the other laser light source that has not been under the control is equal to the luminance before the changed in the current value in step ST16. The light emission control portion 18 sets the cycle and the OFF period based on the pulse width set in step ST17 (step ST18) and terminates the procedure. The light emission control portion 18 then outputs the control signal S1, which causes the light source drive section 50 to output the pulse signals S5 and S6 containing the thus set cycles, pulse widths, and OFF periods, to the light source drive section 50.

As described above, the projector 1 according to the first embodiment to which the invention is applied includes the light modulation device 22, which modulates the RGB three color light fluxes, the plurality of laser light sources 42 and 43 corresponding to at least any of the color light fluxes, the laser light source drivers 62 and 63, which supply the laser light sources 42 and 43 with the pulse currents S7 and S8 to cause the laser light sources 42 and 43 to emit light, the current control portion 61, which sets a current value used by the laser light source drivers 62 and 63, and the light emission control portion 18, which sets the cycle and the pulse-ON period of the pulse currents S7 and S8 to be supplied to the laser light sources 42 and 43 by the laser light source drivers 62 and 63 and specifies a current value used by the current control portion 61. When the luminance of one of the laser light sources 42 and 43 is set at a value that causes the ON period of the pulse current flowing through the laser light source to be narrower than a preset lower limit, the light emission control portion 18 sets the ON period of the pulse current flowing through the laser light source at the lower limit or a length longer than the lower limit and reduces the current value of the pulse current flowing through the laser light source at the same time, whereby the luminance values of the laser light sources 42 and 43 can be adjusted to lower values by reducing the values of the currents supplied to the laser light sources 42 and 43 without the periods over which the laser light sources 42 and 43 emit light being shorter than the lower limit. As a result, the laser light sources 42 and 43 are allowed to stably emit light, and the adjustable range of the luminance of each of the laser light sources 42 and 43 can be widened.

Further, in the projector 1, to achieve a preset ratio among the amounts of several color light fluxes, the ON period ratio between the pulse signals S5 and S6 for the laser light sources 42 and 43 or the luminance ratio between the laser light sources 42 and 43 is set, whereby the luminance adjustment range is not restricted in a configuration in which the luminance values of the laser light sources 42 and 43 are not equal to each other and the luminance adjustment range of one of the laser light sources 42 and 43 limits the luminance adjustment range of the other one of the laser light sources 42 and 43.

Moreover, to reduce the current value of one of the pulse currents S7 and S8 flowing through the laser light sources 42 and 43, the light emission control portion 18 may set a longer ON period of the corresponding one of the pulse currents S7 and S8 flowing through the laser light sources 42 and 43 than the ON period in a case where the current value is not reduced. In this case, the luminance of the laser light sources 42 and 43 can be minutely adjusted because the luminance of the laser light sources 42 and 43 is lowered by reducing the current values of the pulse currents S7 and S8 whereas the luminance is increased by setting longer ON periods of the pulse currents S7 and S8.

Further, since the light emission control portion 18 switches a current value of each of the pulse currents S7 and S8 flowing through the laser light sources 42 and 43 to another in a stepwise manner, the current control portion 61 and the laser light source drivers 62 and 63, each of which has a simple configuration, can be used to widen the adjustable range of the luminance of the laser light sources 42 and 43.

The projector 1 further includes the limiter 53, which prevents a pulse signal having an ON period shorter than the lower limit from being inputted to each of the laser light sources 42 and 43, whereby the laser light sources 42 and 43 are allowed to emit light in a stable manner.

Further, when the luminance values of the laser light sources 42 and 43 or the amounts of color light fluxes are specified, the light emission control portion 18 determines the proportion of the ON periods during which the laser light sources 42 and 43 emit light to one cycle of the pulse signals S5 and S6 based on the specified luminance values or amounts of light, whereby the laser light sources 42 and 43 are allowed to emit light in a stable manner in accordance with the specified luminance values or amounts of light of color light fluxes.

Further, when the current control portion 61 reduces the current value set by the current control portion 61 based on the luminance of one of the laser light sources 42 and 43, that is, the laser light source under the control, the light emission control portion 18 changes the ON period of the pulse current associated with the pulse signal for controlling the other laser light source that has not been under the control in such a way that a decrease in luminance due to the decrease in the current value is compensated, whereby the laser light sources 42 and 43 are allowed to emit light in a stable manner and the adjustable range of the luminance of the laser light sources 42 and 43 can be widened based on the simple circuit configuration in which the common current control portion 61 sets a current value used by the laser light source drivers 62 and 63.

In the configuration according to the present embodiment, the laser light source drivers 62 and 63 as well as the current control portion 61 can be replaced with a single driver circuit. In this case, further cost reduction and efficient control are achieved.

In the present embodiment, the control described above can be combined with control in which one or more pulses are not outputted in a predetermined cycle that is an integral multiple of the pulse cycle, that is, pulse intermitting control. Consider a case where part of the pulses of one of the pulse currents S7 and S8 is not outputted, for example, m pulses out of n pulses outputted within n cycles that form one cycle are not outputted. Since the light-on period of the laser light source that emits light based on the thus configured pulse signal is reduced to a value obtained by multiplying the light-on period in a case where no pulse intermitting control is performed by (n−m)/n, the luminance can be lowered as a result of the pulse intermitting control. The luminance of the laser light sources 42 and 43 can therefore be adjusted by performing the control in which the pulses in the pulse currents S7 and S8 are intermittently outputted, whereby a more variety of luminance adjustment can be made by combining the pulse width adjustment and the current value adjustment described above with the pulse intermitting control. For example, when the current control portion 61 is configured to set a current value in a stepwise manner, the luminance of the laser light sources can be more minutely adjusted by combining the control described above with the pulse intermitting control.

Second Embodiment

Figure 6:
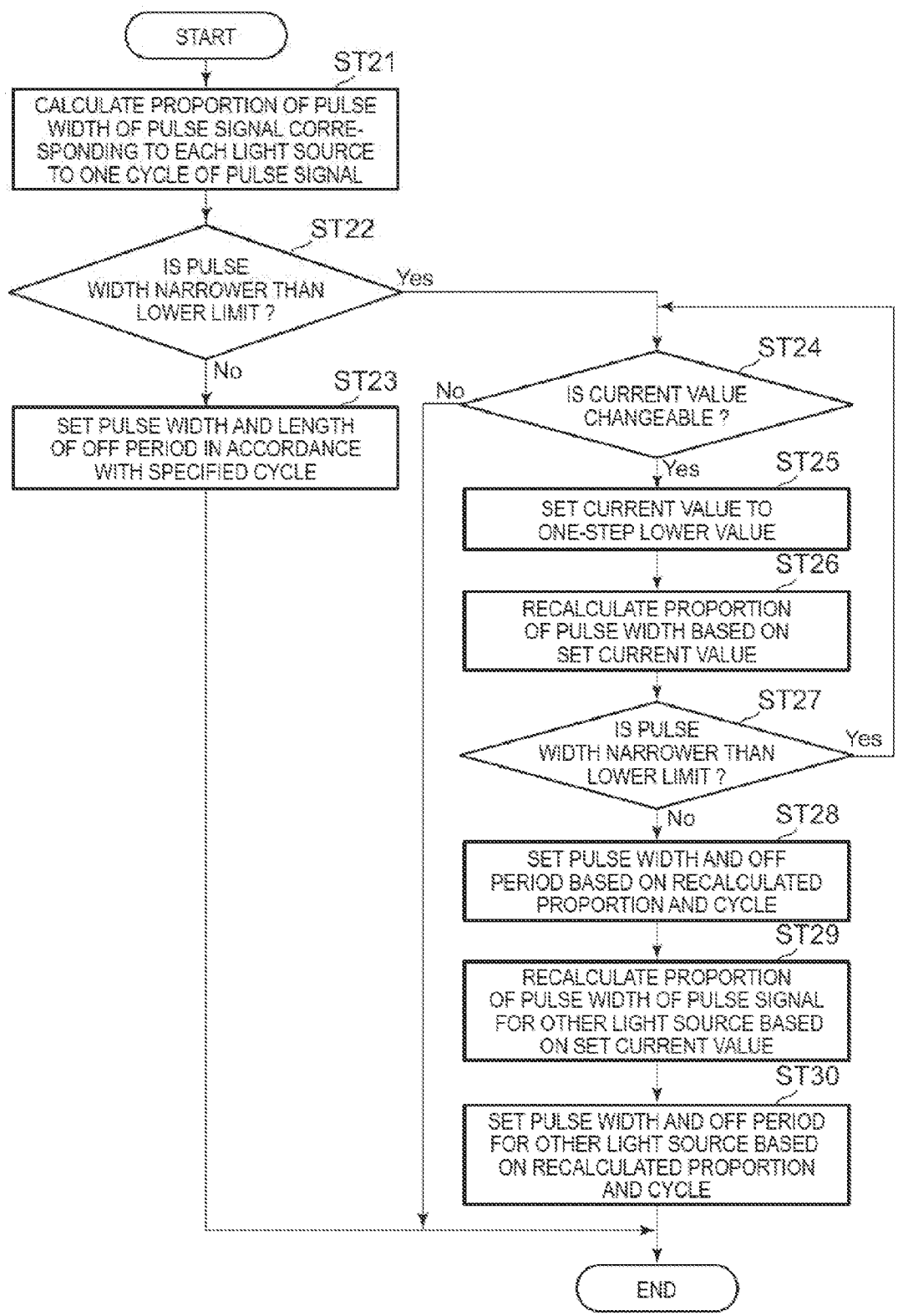
FIG. 6 is a flowchart showing the action of a projector according to a second embodiment.

FIG. 6 is a flowchart showing the action of a projector 1 according to a second embodiment. FIG. 6 particularly shows the action of the projector 1 performed when the light emission control portion 18 controls the pulse width and the current value of each of the pulse currents S7 and S8. In the second embodiment, the configuration of the projector 1 is the same as that in the first embodiment described above, and no illustration or description of the projector 1 according to the second embodiment will therefore be made.

The action shown in FIG. 6 is performed not only when the projection is initiated but also at predetermined intervals during a period over which the light emission control portion 18 controls the light source drive section 50 and the laser light source drivers 62 and 63, as in the case of the action shown in FIG. 5.

The light emission control portion 18 acquires the proportion of the pulse width of each of the pulse currents S7 and S8 corresponding to the laser light sources 42 and 43 to one cycle of the pulse current (step ST21). A specific process in step ST21 is the same as that in step ST11 (FIG. 5).

The light emission control portion 18 judges whether or not the pulse width of either the pulse current S7 or S8 that corresponds to the proportion acquired in step ST21 is narrower than a preset lower limit (step ST22). When both the pulse widths of the pulse currents S7 and S8 are wider than or equal to the lower limit (step ST22: No), the light emission control portion 18 sets the cycle of each of the pulse signals at the specified value, sets the pulse width and the length of the OFF period based on the cycle and the proportion acquired in step ST21 (step ST23), and terminates the procedure. The light emission control portion 18 then outputs the control signal S1 to the light source drive section 50 in accordance with the thus set cycles, pulse widths, the lengths of the OFF periods.

On the other hand, when the pulse width of either the pulse current S7 or S8 is narrower than the lower limit (step ST22: Yes), the light emission control portion 18 judges whether or not the current value is changeable (step ST24). The current control portion 61, which selects the current value from multiple values in a stepwise manner, cannot change the current value to a lower value when the current value has been set at the minimum of the settable current values in step ST24. In this case, the light emission control portion 18 judges that the current value cannot be changed (step ST24: No) and then terminates the procedure.

When the light emission control portion 18 judges that the current value is changeable to lower current value (step ST24: Yes), the light emission control portion 18 controls the current control portion 61 to change the current value of the pulse currents S7 and S8 to a value one step lower than the currently set value (step ST25).

Subsequently, the light emission control portion 18 recalculates the proportion of the pulse width calculated in step ST21 based on the current value set in step ST25 (step ST26). The calculation is made on the pulse current having a pulse width having been judged to be narrower than the lower limit in step ST22 based on the luminance of the laser light source to which the pulse current is supplied.

The light emission control portion 18 judges whether or not the pulse width corresponding to the proportion calculated in step ST26 is narrower than the lower limit (step ST27). When the pulse width is equal to or wider than the lower limit (step ST27: No), the light emission control portion 18 sets the pulse width and the OFF period based on the proportion of the pulse width calculated in step ST26 and the cycle (step ST28). The pulse width and the OFF period of the pulse current supplied to one of the laser light sources 42 and 43 are thus set.

The light emission control portion 18 then calculates the proportion of the pulse width of the other one of the pulse currents S7 and S8 based on the current value set in step ST25 (step ST29). The light emission control portion 18 then sets the pulse width and the OFF period based on the proportion of the pulse width calculated in step ST29 and the cycle (step ST30). The pulse width and the OFF period of the pulse current supplied to the other one of the laser light sources 42 and 43 are thus set.

After the projector 1 performs the action shown in FIG. 6, the pulse widths, the OFF periods, the cycles, and the current values of both the pulse currents S7 and S8 supplied to the laser light sources 42 and 43 can be so set that the pulse widths are wider than or equal to the lower limit and the laser light sources 42 and 43 have luminance values having been set, whereby the same advantageous effects provided in the first embodiment described above are provided.

Third Embodiment

Figure 7:
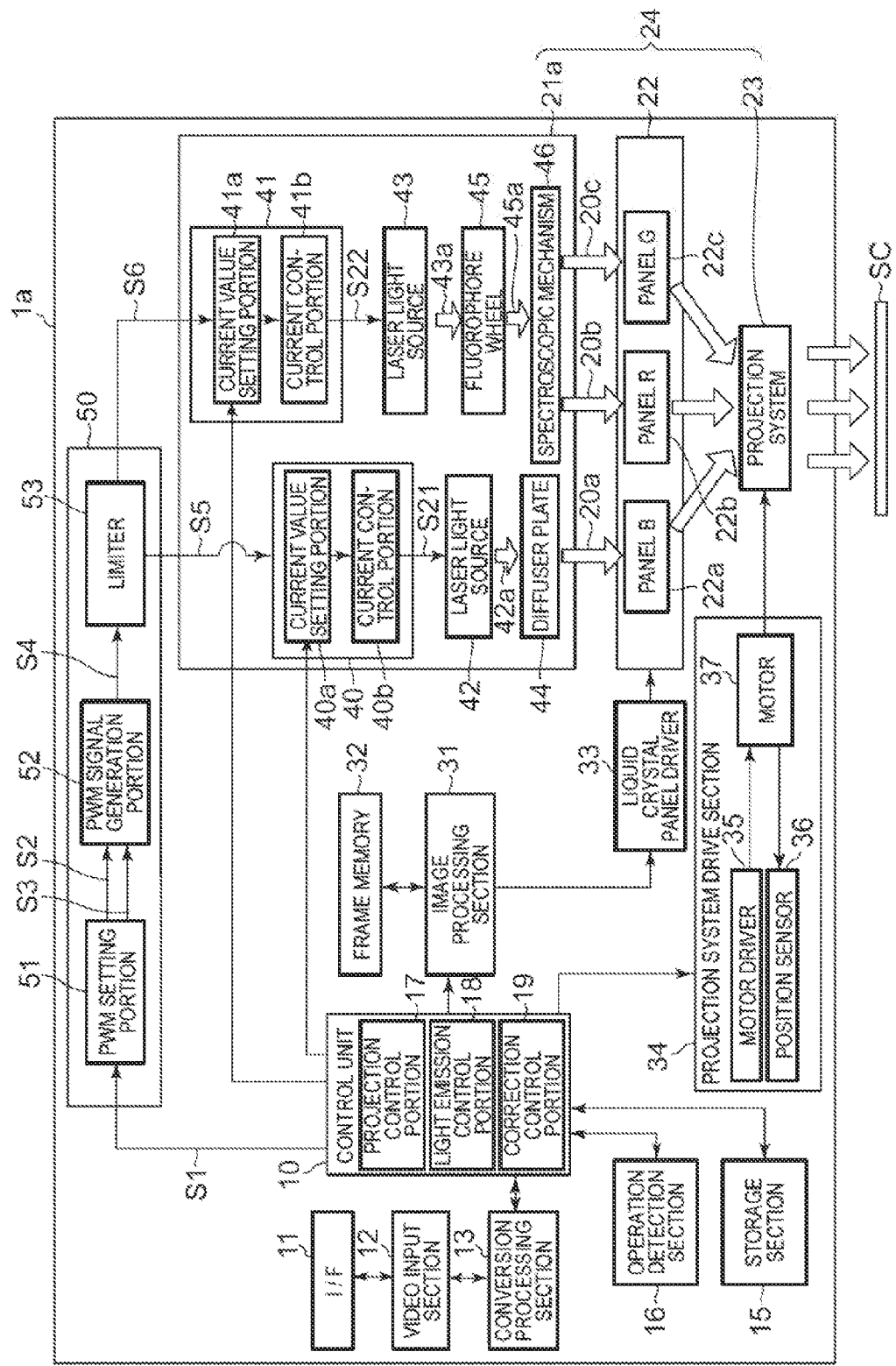
FIG. 7 is a functional block diagram of a projector according to a third embodiment.

FIG. 7 is a block diagram showing a functional configuration of a projector 1*a* according to a third embodiment. The projector 1*a* has the components configured in the same manner as in the projector 1 described in the above first embodiment, and the components have the same reference characters and will not be described.

The projector 1*a* includes a projection unit 24 including a light source section 21*a* in place of the light source section 21 provided in the projector 1 (FIG. 1). The light source section 21*a* includes laser light source drivers 40 and 41 in place of the laser light source drivers 62 and 63 and the current control portion 61 in the light source section 21 (FIG. 1).

The laser light source driver 40 includes a current value setting portion 40*a* and a current control portion 40*b* and supplies the laser light source 42 with a pulse current S21 in accordance with the pulse signal S5 inputted from the light source drive section 50. The current value setting portion 40*a* sets the current value of the pulse current S21 in accordance with control information inputted from the control unit 10. The current control portion 40*b* produces, based on the electric power supplied from the power source circuit (not shown) in the projector 1, the pulse current S21 synchronized with the pulse signal S5 inputted from the light source drive section 50 and having the current value set by the current value setting portion 40*a* and outputs the pulse current S21 to the laser light source 42.

The laser light source driver 41 includes a current value setting portion 41*a* and a current control portion 41*b* and supplies the laser light source 43 with a pulse current S22 in accordance with the inputted pulse signal S6. The current value setting portion 41*a* sets the current value of the pulse current S22 in accordance with the control information inputted from the control unit 10. The current control portion 41*b* produces, based on the electric power supplied from the power source circuit (not shown) in the projector 1, the pulse current S22 synchronized with the pulse signal S6 inputted from the light source drive section 50 and having the current value set by the current value setting portion 41*a* and outputs the pulse current S22 to the laser light source 43.

In the projector 1*a*, the current value of the pulse current S21 supplied to the laser light source 42 and the current value of the pulse current S22 supplied to the laser light source 43 can therefore be separately set under the control of the control unit 10.

The light emission control portion 18 sets the pulse width and the length of the OFF period of each of the pulse currents S21 and S22 based on the luminance at which the corresponding one of the laser light sources 42 and 43 emits light. When the pulse width is narrower than the lower limit, the light emission control portion 18 reduces the current value of the pulse current.

The light emission control portion 18 sets the pulse width of the pulse current S21 based on the luminance of the laser light source 42. When the pulse width of the pulse current S21 is narrower than the lower limit, the light emission control portion 18 controls the current value setting portion 40*a* to change the current value of the pulse current S21 to a lower current value. The light emission control portion 18 further sets the pulse width of the pulse current S22 based on the luminance of the laser light source 43. When the pulse width of the pulse current S22 is narrower than the lower limit, the light emission control portion 18 controls the current value setting portion 41*a* to change the current value of the pulse current S22 to a lower current value.

As described above, the light emission control portion 18 can separately set the current values of the pulse currents S21 and S22 by using the laser light source drivers 40 and 41. Therefore, the control described with reference to (5) and (6) in FIG. 4 and steps ST17 and ST18 in FIG. 5, in which when the current value of the pulse current corresponding to one of the laser light sources is changed, the pulse width of the pulse current corresponding to the other laser light source is changed, is not performed.

As described above, since the light emission control portion 18 can control the current value setting portion 40*a* and the current value setting portion 41*a* separately to set the current values of the pulse currents S7 and S8 independently, only the current value of the pulse current corresponding to the laser light source the luminance of which is set at a value lower than the range having the lower limit set by the limiter 53 can be reduced, whereby each of the laser light sources 42 and 43 is allowed to emit light in an optimum condition.

The embodiments described above are presented only by way of examples of specific aspects to which the invention is applied and do not limit the scope of the invention, and the invention is applicable as an aspect different from the embodiments described above. The above embodiments have been described with reference to the case where the light modulation device 22 is formed of the three transmissive liquid crystal panels 22*a*, 22*b*, and 22*c* corresponding to the RGB colors, but the invention is not necessarily configured this way. For example, reflective liquid crystal panels may be used, or three digital mirror devices (DMDs) that modulate the RGB color light fluxes may be used. Still alternatively, liquid crystal panels or DMDs can be replaced without problems with any components capable of modulating the light beams emitted from the laser light sources 42 and 43.

Further, the above embodiments have been described with reference to the case where the two laser light sources 42 and 43 are so provided that the blue laser light 42*a* emitted from the laser light source 42 is diffused into the blue light 20*a* and the blue laser light 43*a* emitted from the laser light source 43 is converted by the fluorophore wheel 45 into the yellow light 45*a* and further separated into the red light 20*b* and the green light 20*c*, but the invention is not necessarily configured this way. For example, a configuration in which three laser light sources corresponding to the RGB color light fluxes are provided may be employed, or a configuration in which laser light emitted from a single laser light source is separated into RGB color light fluxes may be employed. Further, each laser light source may be of an arbitrary type and may have an arbitrary specific configuration, and a semiconductor laser light source or a variety of other light emission methods can be employed. Moreover, the laser light sources 42 and 43 can be replaced with LED light sources. In this case, a configuration in which three LED light sources corresponding to the RGB color light fluxes are provided may be employed, or a configuration in which a light flux emitted from one or two LED light sources is separated as appropriate into the RGB color light fluxes may be employed. In addition to the above, the type of each light source is not limited to a specific type as long as the luminance of the light source can be adjusted based on PWM control.

The display apparatus according to any of the aspects of the invention is not limited to a projector that projects an image on the screen SC. A variety of other display apparatus that uses a PWM-controllable light source, such as a liquid crystal monitor or a liquid crystal television that displays an image on a liquid crystal display panel or a monitor apparatus, a television receiver, or a self-luminous display apparatus that displays an image on a PDP (plasma display panel), are encompassed within the range of image display apparatus according to the invention. Further, the functional portions shown in FIGS. 1 and 7 show functional components of the projectors 1 and 1*a*, and the implementation thereof is not limited to a specific one. That is, hardware corresponding to each of the functional portions is not necessarily implemented, but the function of part of the functional portions can, of course, be achieved by software or by a program executed by a processor, and the other detailed components can be arbitrarily changed.

In the embodiments described above, the limiter 53 removes pulses having a pulse width narrower than a preset lower limit, but the limiter 53 is not necessarily configured this way. For example, the limiter 53 may convert pulses having a pulse width narrower than a preset lower limit into pulses having a pulse width equal to the lower limit instead of removing the pulses.

Further, in the embodiments described above, at least one of the current control portion and the current setting portion can set a current value in a stepwise manner as a simple configuration, but the invention is not necessarily configured this way. For example, a more complicated circuit than in the embodiments described above may be used to set a current value in a variable manner.

Further, in the embodiments described above, the current control portion that controls the current value setting is provided in the light source section 21, but the invention is not necessarily configured this way. For example, the current control portion may be provided in the control unit 10 and control the current values as part of the control unit 10.

What is claimed is:

1. A display apparatus comprising:
a display unit including a modulator that modulates a plurality of color light fluxes and a light source section that includes a plurality of light sources each corresponding to at least one of the color light fluxes;
a light source driver that supplies the light sources with pulse currents to cause the light sources to emit light fluxes; and
a controller that sets the cycle of the pulse current supplied to each of the light sources by the light source driver and an ON-period of the pulses in the pulse current in accordance with a luminance of the light source,
wherein
when the luminance of any of the light sources is so set that the ON-period of the pulse current flowing through the light source is shorter than a preset lower limit, the controller sets a length of the ON-period of the pulse current flowing through the light source to be equal to the lower limit or at a value longer than the lower limit and reduces the current value of the pulse current flowing through the light source,
when the luminance of a first light source of the plurality of light sources is adjusted and the luminance of a second light source of the plurality of light sources is not adjusted:
the controller sets the length of the ON-period of the pulse current flowing through the first light source to be equal to the lower limit or at a value longer than the lower limit and reduces the current value of the pulse current flowing through the first light source from a first current value to a second current value, and the controller sets the current value of the pulse current value flowing through the second light source to match the second current value of the first light source and sets the length of the ON-period of the pulse current flowing through the second light source to be a value that, when combined with the second current value of the first light source, maintains the luminance of the second light source at a same level as before the pulse current value of the second light source is changed to the second current value of the first light source, and the controller switches the first current value of the pulse current flowing through each of the light sources to the second current value in a stepwise manner such that at least one intermediate current value having a value between the first current value and the second current value is supplied after the first current value and before the second current value.

2. The display apparatus according to claim 1, wherein an ON-period ratio among the pulse currents flowing through the light sources or a luminance ratio among the light sources is set to achieve a preset ratio among the amounts of the plurality of color light fluxes.

3. The display apparatus according to claim 1, wherein when the current value of the pulse current flowing through one of the light sources is reduced, the controller sets a longer ON-period of the pulse current flowing through the light source than the ON-period in a case where the current value is not reduced.

4. The display apparatus according to claim 1, further comprising a current setting unit that sets a current value common to the plurality of light sources, wherein when the current setting unit changes the current value of the currents supplied to the light sources to a lower value, the controller changes the ON-period of the pulse current flowing through any of the light sources in such a way that a decrease in the luminance thereof due to the decrease in the current value is compensated.

5. A method for controlling a display apparatus that modulates a plurality of color light fluxes to display an image, the method comprising:

supplying a plurality of light sources with pulse currents to cause the light sources to emit light fluxes;

setting a cycle of the pulse current supplied to each of the light sources and an ON-period of the pulses in the pulse current in accordance with the luminance of the light source;

when the luminance of any of the light sources is so set that the ON-period of the pulse current flowing through the light source is shorter than a preset lower limit, setting the length of the ON-period of the pulse current flowing through the light source to be equal to the lower limit or at a value longer than the lower limit and reducing the current value of the pulse current flowing through the light source, and when the luminance of a first light source of the plurality of light sources is adjusted and the luminance of a second light source of the plurality of light sources is not adjusted:

setting the length of the ON-period of the pulse current flowing through the first light source to be equal to the lower limit or at a value longer than the lower limit and reduces the current value of the pulse current flowing through the first light source from a first current value to a second current value, and setting the current value of the pulse current value flowing through the second light source to match the second current value of the first light source and sets the length of the ON-period of the pulse current flowing through the second light source to be a value that, when combined with the second current value of the first light source, maintains the luminance of the second light source at a same level as before the pulse current value of the second light source is changed to the second current value of the first light source, wherein the first current value of the pulse current flowing through each of the light sources switches to the second current value in a stepwise manner such that at least one intermediate current value having a value between the first current value and the second current value is supplied after the first current value and before the second current value.

6. The method according to claim 5, further comprising setting an ON-period ratio among the pulse currents flowing through the light sources or a luminance ratio among the light sources to achieve a preset ratio among the amounts of the plurality of color light fluxes.

7. The method according to claim 5, further comprising when the current value of the pulse current flowing through one of the light sources is reduced, setting a longer ON-period of the pulse current flowing through the light source than the ON-period in a case where the current value is not reduced.

8. The method according to claim 5, further comprising setting a current value common to the plurality of light sources, and when the current value of the currents supplied to the light sources is changed to a lower value, changing the ON-period of the pulse current flowing through any of the light sources in such a way that a decrease in the luminance thereof due to the decrease in the current value is compensated.

* * * * *